United States Patent [19]

Weber

[11] Patent Number: 5,225,996
[45] Date of Patent: Jul. 6, 1993

[54] EMISSIONS MONITORING AND TRACKING SYSTEM

[75] Inventor: Eugene H. Weber, Long Beach, Calif.

[73] Assignee: Fugitive Emissions Control, Inc., Long Beach, Calif.

[21] Appl. No.: 854,729

[22] Filed: Mar. 23, 1992

Related U.S. Application Data

[62] Division of Ser. No. 595,262, Oct. 9, 1990, Pat. No. 5,099,437.

[51] Int. Cl.⁵ ............................................. G06F 15/20
[52] U.S. Cl. ................................................. 364/550
[58] Field of Search .................... 364/464.04, 506, 550

[56] References Cited

U.S. PATENT DOCUMENTS

| | | | |
|---|---|---|---|
| Re. 31,750 | 11/1984 | Morrow | 364/550 X |
| 3,951,389 | 4/1976 | Porter | 364/556 X |
| 3,999,046 | 12/1976 | Porter | 364/506 |
| 4,124,840 | 11/1978 | Kobayashi | 364/550 X |
| 4,133,034 | 1/1979 | Etter | 364/464.04 |
| 4,156,280 | 5/1979 | Griess | 364/550 X |
| 4,231,249 | 11/1980 | Zuckerman | 340/632 |
| 4,352,164 | 9/1982 | Reed et al. | 364/464.04 |
| 4,471,218 | 9/1984 | Culp | 235/472 |
| 4,526,028 | 7/1985 | Hubner | 340/632 |
| 4,570,057 | 2/1986 | Chadima, Jr. et al. | 235/472 |
| 4,621,189 | 11/1986 | Kumar et al. | 235/472 |
| 4,628,193 | 12/1986 | Blum | 235/375 |
| 4,668,940 | 5/1987 | Beard et al. | 340/521 |
| 4,710,616 | 12/1987 | Utley | 235/472 |
| 4,736,096 | 4/1988 | Ushikubo | 235/472 |
| 4,803,632 | 2/1989 | Frew et al. | 364/464.04 |
| 4,857,713 | 8/1989 | Brown | 235/375 |
| 4,916,441 | 4/1990 | Gombrich | 340/712 |
| 5,099,437 | 3/1992 | Weber | 364/550 |

Primary Examiner—Edward R. Cosimano
Attorney, Agent, or Firm—Fulwider Patton Lee & Utecht

[57] ABSTRACT

A portable subsystem carried by the inspector includes an identification scanner, an emissions sensor and a portable data collector. An inspector identifies the release point by use of a portable scanner and then tests the release point for leaks. The portable data collector stores the identification along with the emissions test data. At periodic intervals the portable data collector is connected to a main computer and the stored data is uploaded. The main computer analyzes the uploaded data for a pass or fail of the release point of the emissions test and issues the appropriate comparison results. Additionally, the severity of the leak is determined and remedial action is specified. This remedial action includes issuance of a repair report and updating the repair schedule, updating the inspection schedule for reinspection after repairs are completed and updating the inspection history. The computer maintains data sufficient to generate reports tailored to the requirements of government agencies.

20 Claims, 2 Drawing Sheets

EMISSIONS MONITORING AND TRACKING SYSTEM

This is a divisional of copending application Ser. No. 07/595,262 filed on Oct. 9, 1990 now U.S. Pat. No. 5,099,437.

BACKGROUND OF THE INVENTION

The invention is generally related to sensors and, more particularly, to systems for detecting hydrocarbon emissions and for tracking the history of equipment tested for emissions.

The desirability of reducing harmful hydrocarbon emissions has long been recognized. Accurate and reliable emissions monitoring has a high priority in many geographical areas and progressively more stringent emission control standards have been promulgated, particularly in high air pollution areas. For example, Rule 1173 of the State of California relates to the Fugitive Emissions of Volatile Organic Compounds and has monitoring, record keeping and reporting requirements. The rule is meant to apply to petrochemical facilities, including refineries, pumping stations and storage facilities. Hydrocarbon emissions are to be monitored, identified and recorded and if the emissions exceed certain limits, repair action is to be undertaken.

Federal Rule 49 (37 CFR §191 and §192) is another emission standard which addresses somewhat different emissions but nevertheless imposes monitoring, recording and reporting requirements on petrochemical facilities.

In general, these rules require that each possible point of escape for hydrocarbons, or "release point", in a petrochemical facility be identified, monitored and tracked. That is, each fitting, joint, packing gland, flange and other possible points where hydrocarbons could escape must be monitored and tracked. Leak limits have been established and in the event that emissions from a release point exceed the limit, corrective action must be taken. Under California Rule 1173, the type of corrective action depends upon the severity of the leak. For example, a slight leak, but one that exceeds the threshold nevertheless, may be subject to repair within fourteen days of detection while a massive liquid leak may be subject to immediate repair.

Tracking the leak history of a release point is important because the favorable leak history of a release point may, under California Rule 1173, qualify that release point for a reduced monitoring schedule. Conversely, a poor leak history may result in a requirement that the part be replaced or that the joint be reformed or that other corrective maintenance action be taken.

One prior technique for monitoring such emissions involved manual sensing and recording. Emissions were sensed by a portable vapor analyzer, the results were displayed by that analyzer and the operator would then record the results manually. Such a system had a potential for operator error, including mis-identification of the release point, incorrectly recording the release point identification, misreading the sensor, incorrectly recording the sensed emissions, illegibility of writing, and other possible errors.

One desired effect of the above-mentioned emission standards is to cause increased automation of monitoring and tracking efforts. Methodologies involving automation of as many steps as possible are preferable. It is believed that such automation will result in more consistent and reliable monitoring of emissions and recordkeeping. Optimally, the equipment used for identifying, monitoring, recording and reporting would define a closed system in which human error would be minimized. Direct communication between all system components involved in identification of the release point under test, sensing emissions from that release point, data recording and processing, and report generation would provide an integration of the system to an extent that the system would be more reliable and operator error would be minimized. The invention fulfills these needs.

SUMMARY OF THE INVENTION

Briefly and in general terms, the present invention provides a new and useful emissions monitoring and tracking system. The invention is directed to a system for identifying various release points, inspecting the release points for emissions, tracking their inspections, tracking repairs, and creating records and reports of these activities. In accordance with the invention, the system includes a portable subsystem carried by the inspector which includes an identification scanner, an emissions sensor and a portable processor for storing certain inspection data.

Identification tags are attached to the release points to be inspected. The inspector identifies the release point by scanning the identification tag with a portable scanner. The inspector then tests the release point for emissions. The portable processor stores the identification data along with the emissions test data. At periodic intervals the portable processor is connected to a main computer to upload the stored data. The main computer analyzes the uploaded data to determine if each release point passed or failed the emissions test and issues the appropriate test results. The main computer may also store the test data along with the inspection date, identification code, test results, test equipment identification and inspector identification.

Additionally, the severity of the leak is determined and the required remedial action is specified. This remedial action may include adding the release point to a repair list, updating the repair schedule, updating the inspection schedule for re-inspection after repairs are completed and updating the maintenance and inspection histories. The main computer is capable of generating reports tailored to the requirements of interested government agencies. The main computer also tracks the repair history of individual equipment items and can report on an item requiring frequent repairs. This main computer is capable of performing the above functions in cooperation with commercially available programs for scheduling maintenance or other activities.

These and other objects and advantages of the invention will become apparent from the following more detailed description, when taken in conjunction with the accompanying drawings of illustrative embodiments.

DETAILED DESCRIPTION OF THE PREFERRED EMBODIMENT

Figure 1:
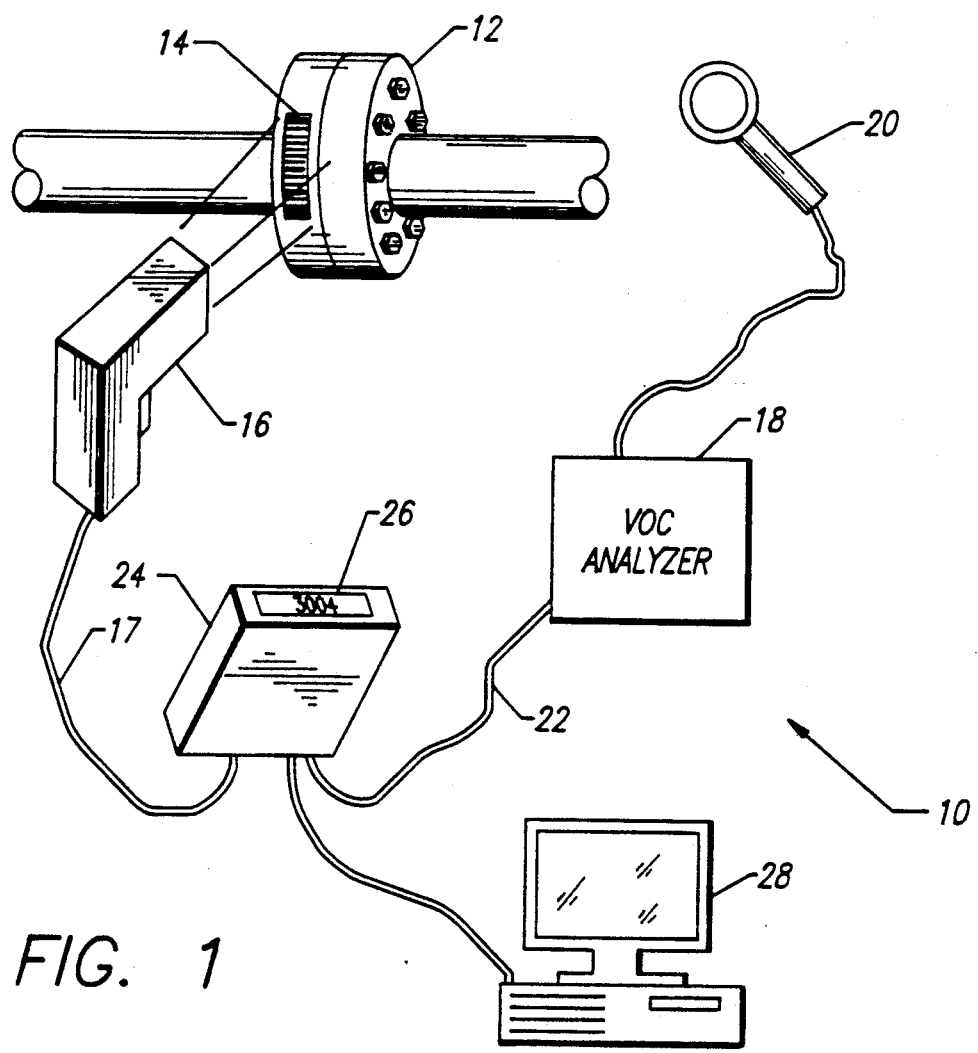
FIG. 1 is a diagram of an emissions monitoring and tracking system in accordance with the principles of the present invention showing a barcode on a release point, a barcode scanner, a volatile organic compounds analyzer, a portable data collector with an emissions reading displayed on its front panel and a main computer.

In the following description, like reference numerals will be used to refer to like or corresponding elements in the different figures of the drawings. Referring now to the drawings, and particularly to FIG. 1, there is shown an emissions monitoring and tracking system 10 in accordance with the principles of the invention. A joint 12 is shown which connects two pipes used to conduct hydrocarbons such as petroleum and petroleum by-products. The joint is referred to as a "release point" and under various environmental rules and regulations, is subject to periodic testing for leakage of the hydrocarbons conducted. An identification tag 14 has been attached to the joint in a permanent manner such as by use of rivets, an adhesive, a protected container or screws. In the embodiment shown, the tag is in the form of a barcode. The identification tag may be formed of different materials depending upon the substances conducted by the item to which it is attached. Materials resistant to deleterious environments should be used in the identification tag. In the case where hydrocarbons are conducted, the tag may be formed of oxidized aluminum. The bar code may be imbedded in the aluminum and then laminated. The identification tag is attached at or near the item to be inspected. In the example of the joint between two pipes as shown, the identification device could also be strapped to one pipe near the joint. Where the release point permits, the tag may be attached by brads, chain or some other locking device. While a barcode identification system is shown and described above, other systems such as a magnetic identification system may also function adequately.

In one embodiment, where the system in accordance with the invention is to be applied to a refinery having numerous joints, fittings, packing glands, flanges and other types of release points, the identification tag carries a unique identification code. Each release point in the system therefore has a unique identification code and can be tracked individually. In one embodiment, bar code symbology Code 39 was used. The selection of the width and number of the bar code elements is well known to those skilled in the art and no further explanation is provided here.

Also shown in FIG. 1 is a portable barcode scanner 16. In the embodiment shown, the scanner is a laser type capable of reading the bar code from a distance. The output of the laser barcode scanner 16 along line 17 is a signal representative of the barcode value scanned. Such a scanner is very light in weight and can be easily transported from release point to release point by many means, one of which is a holster worn on the belt of the inspector.

The output of the laser barcode scanner is coupled to a portable data collector (PDC) 24. The portable data collector 24 receives the identification signal from the barcode scanner on line 17 and formats it as necessary into identification data for storage in an internal storage medium such as a random access memory. In one embodiment, the portable data collector 24 includes a display 26 for indicating the sensed emissions data which, in this case, is displayed as parts per million (ppm). Laser barcode scanners coupled with data collectors are known in the art, one example is the PC-WAND model 800 from Unitech Computer Co., Ltd., Paramount, Calif.

Further referring to FIG. 1, a portable organic emissions sensor 18 is shown. The analyzer includes a movable probe 20 and an output line 22 which carries a signal representative of the vapors sensed and analyzed by the analyzer 18. Such an analyzer may provide a signal representative of the total organic vapor concentrations and qualitative analysis as selected. A vapor analyzer or emissions sensor such as the Century OVA 108 Portable Organic Vapor Analyzer sold by The Foxboro Company, East Bridgewater, Mass., is an example of an emissions sensor usable in accordance with the invention. The Foxboro OVA 108 weighs approximately 26 kilograms (12 pounds). The portable data collector 24 receives the sense signal from the emissions sensor 18 on line 22 and stores the sense signal as emissions sense data in the memory. In the case of the OVA 108 Analyzer from Foxboro, the sense signal is first converted from an analog signal to a digital signal by means of an analog-to-digital converter.

The portable data collector 24 in one embodiment is used to collect various forms of data. For example, at the start of an inspection tour, the inspector scans his or her badge barcode and the identification barcodes of the emissions sensor and the portable data collector itself. These laser scanner signals are each given a date and time and are stored in the portable data collector 24 as data as pertaining to all following inspections of release points on this tour. When making a release point inspection, the release point identification tag is scanned, and it and the date and time are stored as data along with the emissions signal from the emissions sensor 18. An end of the present inspection tour may be indicated to the portable data collector 24 by closing a switch or other means. After receiving the end of tour signal, new inspector, emissions sensor and portable data collector identifications may be entered.

Figure 3:
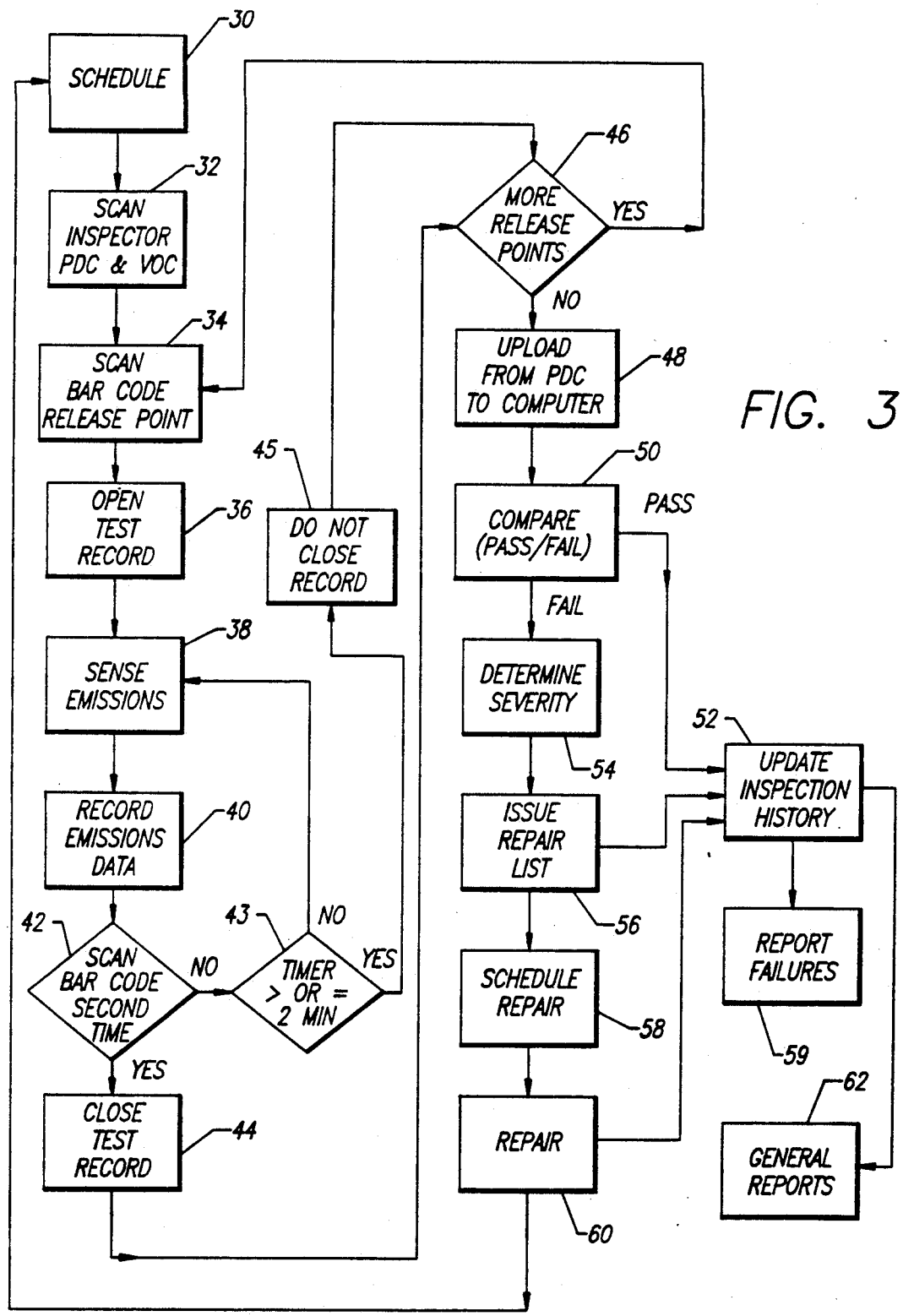
FIG. 3 is a block diagram of an emissions monitor and tracking method in accordance with the invention.

Safeguards may be built into the portable data collector 24, such as a time limit within which signals must be received. In one embodiment, the release point identification tag is first scanned with the laser scanner 16 and upon such scanning, the portable data collector 24 opens a new record in its memory. The inspector must then complete an emissions reading and scan the identification tag a second time within two minutes or the record will not be retained in memory. The second scan of the same identification tag causes the portable data collector 24 to conclude that a successful inspection has been made and the results are to be stored. Failure to scan the identification tag a second time within the two minute limit causes the portable data collector 24 to conclude that an inspection was not successful 43 and no record is stored 45 as shown in FIG. 3. Additionally, audio cues may be provided to the inspector. For example, audible tones may be provided upon each successful scan of an identification tag.

The portable components of the system 10 are light in weight and may be carried by an inspector from release point to release point. In a further embodiment, the emissions sensor 18 may be integrated with the portable data collector 24. The portable data collector 24 may be configured with harness or belt means, holsters, etc. for carrying by the inspector, or may be configured with wheels or a cart for mobility, depending on the size and type of the system.

Figure 2:
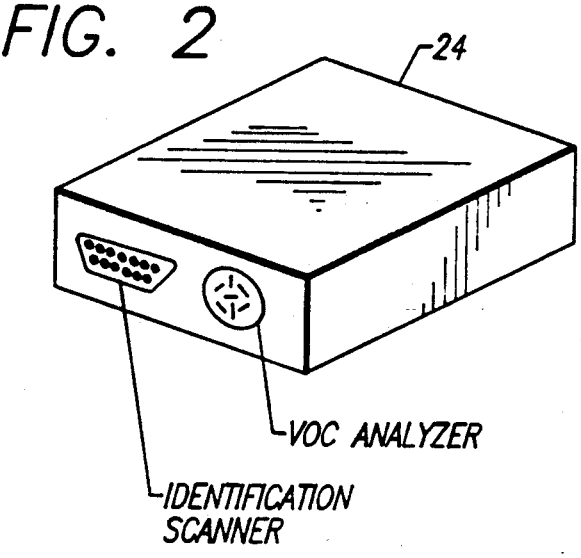
FIG. 2 is a rear view of the portable processor of FIG. 1 showing an example of cable connections.

Referring now to FIG. 2, the rear of a portable data collector 24 is shown so that one example of possible cable connections may be viewed. The bar code scanner is connected with a nine-pin, standard serial interface, RS-232C connector while the emissions sensor is connected with an Amthenol five-pin connector. In this embodiment, the connector used for the laser scanner may also be used as a connector for connecting the portable data collector 24 to the main computer 28 as will be described below in more detail.

Thus, as described above and shown in the FIGS., the portable subsystem provides an indentification and emissions sensing subsystem which is automated. The inspector's tasks include merely scanning test equipment bar codes and finding the correct release point at the facility to be inspected. Once the release point is found, the inspector's tasks are simply mechanical in nature and require no subjective performance. The inspector simply scans the associated identification tag and then applies the emissions sensor to the release point until a reading has been taken. Such automation increases reliability and decreases inspection time.

Under certain emission control regulations, release points must be inspected periodically and the results of the inspection reported. In some areas, these reports must be forwarded to the responsible government agency and in other areas, the reports must be maintained for discretionary inspection by the government agency. The release points are subject to corrective action in the event of an excessive leak and the results of such action must also be reported or at least records of the results maintained.

Referring now to FIGS. 1 and 3, in the preferred embodiment, the main computer 28 determines whether a release point passed or failed an inspection and generates the appropriate written reports. Additionally, an inspection history of each release point may be stored in a magnetic medium for future reference. Report generation may be tailored to the applicable government requirements and in the preferred embodiment, the main computer 28 also issues repair lists.

A schedule 30 of release points to be inspected is given to the inspector. This schedule may be generated by the main computer 28 from a listing of all the release points in the facility, their locations, their inspection frequency and their inspection histories. A dedicated scheduling program may be used or a commercially available scheduling program such as one which might be used for the entire plant (for example "Finest Hour" manufactured by Primavera Systems, Inc. having an address of Cynwyd, Pa.).

In one embodiment, the main computer 28 is used to track all inspections by quarter. During each quarter, a current-quarter database is created and the test results from the current quarter and the previous four quarters are retained by the main computer. This arrangement permits tracking test results over a selected period of time for each release point. Certain emissions control regulatory schemes allow a greater time between inspections for items which have passed a certain number of successive quarterly inspections. For example, California Rule 1173 permits yearly inspections of a release point which has successfully passed five successive quarters. Also, release points requiring frequent repair or parts replacement can be identified. In accordance with California Rule 1173, in the event that a release point fails an inspection six times within four quarters, the release point must be replaced with the best available commercial technology/best available replacement technology (BACT/BART). The main computer is capable of tracking such a history.

Upon receipt of a portable data collector 24, an emissions sensor 18 and the schedule, the inspector may scan 32 his or her identification code and the codes of this equipment by the portable data collector 24 itself. The portable data collector 24 will then apply this data to the following emissions test data until an end-of-tour signal is received. The inspector then locates the release point to be inspected and scans 34 its previously attached bar code label with the portable scanner 16. This first scanning of the identification tag causes the portable data collector 24 to open 36 a record. The inspector then tests 38 the release point for emissions with the emissions sensor 18, 20 until a reading has been taken and recorded 40 by the portable data collector. An audible cue may be provided to the inspector by the portable data collector 24 indicating that the processor has received and recorded emissions test data. The inspector then scans the identification tag of the release point a second time 42. The portable data collector 24 accepts this second scan and closes 44 the record and stores it for future upload. The inspector continues inspecting 46 until the tour is over.

At the end of each day or inspection tour the inspector may upload 48 the stored records from the portable data collector 24 to the central computer 28. In the embodiment shown in FIGS. 1 and 2, the cable to the laser scanner would be removed from the portable data collector 24 and a standard serial cable attached. The serial cable may be connected at its other end directly to the main computer 28 or other means for communicating with the main computer 28.

In the main computer 28, the sense data in the uploaded record for each inspected release point is compared 50 to a predetermined criterion and a "passed" or "failed" status of that release point for that test is determined. In the event that the release point passed the test, its inspection history is updated 52. In the event that the release point failed the test, the severity of the leak is determined 54 and the release point is added to a repair list 56. Depending upon the severity, different repair schedules 58 can be issued. For example, in the case where the leak is greater than 1000 ppm but less than or equal to 10,000 ppm, the leak is classified as minor and a fourteen day work order may be issued. In the case of a leak in a pressure relief device which is greater than 200 ppm, the leak is classified as major and a five day work order may be issued. In the case where the leak is greater than 10,000 ppm but less than or equal to 50,000 ppm, the leak is classified as major and a five day work order may be issued. In the case where the leak is greater than 50,000 ppm but less than or equal to three drops per minute, the leak is classified as a major leak and a one day work order may be issued. In the case where the leak is greater than three drops per minute, the leak is classified as a liquid leak and a one-day work order may be issued. Also in the case of the last two leak classifications, a work order requiring replacement with BACT/BART will be issued if there have been five significant repairs in a continuous twelve month period.

When the release point is added to the repair list, such action is indicated on its inspection history 52 and failure reports generated 59. When the repairs are completed 60 the leak/repair history is updated again 52 and the component is scheduled for reinspection 30. The process for reinspection of an item is identical to the procedure described above. Where repairs or reinspections are not made by the time another repair list is prepared, the unrepaired or uninspected release points appear again on the repair list.

In one embodiment, a release point database is set up in the main computer 28 wherein each item of equipment is identified along with its attributes. These attributes might include the following, by way of example: an ID number assigned to the item; its bar code tag number; what the item services; the unit number of what the item services; location of the item, whether accessible or inaccessible, and the drawing number(s) of the plant drawings showing the item; what type of equipment the item is; whether it is a major or minor component of the plant; the maximum parts per million (ppm) reading allowable for the item when tested; the inspection frequency (i.e. annually, quarterly, etc.); the number of repairs on the item; the schedule status (i.e. not currently scheduled for inspection, passed, or under repair); the old ID number of this item if it has been replaced.

Also in this embodiment, a list of inspectors may be kept as a safeguard in the main computer. The information contained in this database includes for each inspector: his or her name, ID number assigned, and the company the inspector is employed by. This database may be used to keep track of which inspectors are authorized to make inspections and which inspectors inspected what components. The program checks to make sure the identification number is correct and that the inspector is in the database. If not, data processing is delayed.

The embodiment may also track the portable data collector 24 and the emissions analyzer 18 by the main computer 28 as a safeguard. A database containing the identification numbers, the model numbers, and the serial numbers is maintained. This information is used to keep track of the calibration of test equipment. Also, which sensor device was used in each test is tracked.

A leak/repair history database is maintained and has the following fields for example: release point identification number; repair due date; repair that was made; date of repair; work order number; leak class (minor, major, over 50,000 ppm, liquid leak); repair complete, needs reinspection. The fields of this database are updated as to each leak found and work order issued. It is also updated as work orders are completed. Repair schedules and release point reinspection schedules are generated. In the latter case the process is repeated for repaired equipment as discussed above.

Periodically, inspection history and leak/repair history reports may be created 62 based on the data residing in the main computer 28. The reports can be specially formatted for submission to the government agencies that may require such reporting.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. An apparatus for monitoring hydrocarbon emissions from an emissions release point, comparing the monitored emissions to a threshold, and reporting the comparison results, the apparatus comprising:

an identification code disposed at the emissions release point to identify the release point;

a portable data entry device into which the identification code is entered, the data entry device providing an identification signal representative of the identification code;

a portable sensor which senses the hydrocarbon emissions from the release point and provides a sense signal representative of those sensed emissions;

a portable data collector coupled to the data entry device and to the sensor to receive the identification signal and the sense signal and to record the identification and sense signals as data; and a main computer which receives the recorded data from the portable data collector and compares the sense data to a predetermined threshold to determine if the sense data exceeds the threshold and reports the result of the comparison and the identification code of the emissions release point.

2. The apparatus of claim 1 wherein the identification code is carried on a label attached at the release point.

3. The apparatus of claim 1 wherein the main computer further issues a repair report when the sense signal data exceeds the threshold.

4. The apparatus of claim 1 wherein the main computer generates a history of the release point comprising each date that the portable sensor sensed the emissions and the results of each comparison and updates that history for each comparison.

5. The apparatus of claim 1 wherein the portable data collector also records the date and time when it records the identification and sense signals, and the main computer receives the date and time and updates the history of the release point.

6. The apparatus of claim 1 wherein the identification code is unique to the release point.

7. The apparatus of claim 1 wherein the portable data collector opens a record upon receiving a first identification signal of the emissions point, records the identification signal and the sense signal as data and closes and stores the record upon receipt of a second identification signal; and the main computer receives the record, stores the record, and compares the sense data of the record to the predetermined threshold.

8. The apparatus of claim 7 wherein the portable data collector closes and stores the record only if it receives the second identification signal within a predetermined time after receiving the first identification signal.

9. Apparatus for monitoring hydrocarbon emissions from an emissions release point, comparing the monitored emissions to a threshold, and reporting the comparison results, the apparatus comprising:

an identification code disposed at the emissions release point to identify the release point;

a portable data entry device into which the identification code is entered, the data entry device providing an identification signal representative of the identification code;

a portable sensor which senses the hydrocarbon emissions from the release point and provides a sense signal representative of those sensed emissions;

a portable data collector coupled to the data entry device and to the sensor to receive the identification signal and the sense signal and to record the identification and sense signals as data in a record initiated by the identification signal wherein the portable data collector also records the date when it records the data; and a main computer selectively coupled to the portable data collector which receives the recorded data when coupled to the portable data collector, compares the received sense data to a predetermined threshold to determine if the sense data exceeds the threshold, reports the result of the comparison, maintains an emissions history of the release point and updates the history of the release point, and issues a repair report in the event that the sense signal data exceeds the threshold.

10. The apparatus of claim 9 wherein the history of the release point comprises each date that the portable sensor sensed the emissions and the results of each comparison.

11. The apparatus of claim 10 wherein the identification code is unique to the emissions release point.

12. The apparatus of claim 9 wherein the portable data collector opens a record upon receiving a first identification signal of the emissions release point, records the identification signal and the sense signal as data, and closes and stores the record upon receipt of a second identification signal; and the main computer receives the record, stores the record, and compares the sense data of the record to the predetermined threshold.

13. The apparatus of claim 12 wherein the portable data collector will not close and store the record if the second identification signal is not received within a predetermined time after receiving the first identification signal.

14. A method for monitoring hydrocarbon emissions from an emissions release point, comparing the monitored emissions to a threshold, and reporting the comparison results, the method comprising the steps of:

assigning an identification code to the release point;
entering the assigned identification code into a portable data entry device at the release point and providing an identification signal representative of the identification code entered;
sensing hydrocarbon emissions from the release point with a portable emissions sensor and providing an emissions signal representative of the sensed emissions;
receiving the identification signal and the emissions signal and recording the signals as data;
transferring the recorded identification and emissions data to a main computer;
comparing the sensed emissions data of the received record to a predetermined threshold in the main computer to determine if the threshold has been exceeded, and reporting the result of the comparison; and
storing the result of the comparison with the identification data.

15. The method of claim 14 further comprising the step of issuing a repair report when the sensed emissions data exceeds the predetermined limit.

16. The method of claim 14 further comprising the step of generating a history of the release point comprising each date that the portable sensor sensed the emissions and the results of each comparison.

17. The method of claim 14 further comprising the steps of:

recording the date when the identification and sense signals are recorded as data;
transferring the recorded date, identification, and emissions data to the main computer; and
storing the result of the comparison, the identification data and the date.

18. The method of claim 14 wherein the step of assigning an identification code comprises assigning a unique identification code to the emissions release point.

19. The method of claim 14 further comprising the steps of:

opening a record upon receiving a first identification signal of the emissions point;
recording the identification signal and the sense signal as data; and
closing and storing the record upon receipt of a second identification signal.

20. The method of claim 19 wherein the step of closing and storing the record occurs only when a second identification signal is received within a predetermined time after receiving the first identification signal.

* * * * *